United States Patent
Sakamoto et al.

(10) Patent No.: US 6,816,753 B2
(45) Date of Patent: Nov. 9, 2004

(54) ROBOT CONTROL SYSTEM AND ROBOT CONTROL METHOD

(75) Inventors: Takayuki Sakamoto, Kanagawa (JP); Makoto Inoue, Kanagawa (JP); Naoyasu Hosonuma, Saitama (JP); Tsuyoshi Takagi, Kanagawa (JP); Masahiro Fujita, Saitama (JP)

(73) Assignee: Sony Corporation, Tokyo (JP)

( * ) Notice: Subject to any disclaimer, the term of this patent is extended or adjusted under 35 U.S.C. 154(b) by 168 days.

(21) Appl. No.: 10/168,993
(22) PCT Filed: Oct. 9, 2001
(86) PCT No.: PCT/JP01/08846
§ 371 (c)(1), (2), (4) Date: Dec. 16, 2002
(87) PCT Pub. No.: WO02/30626
PCT Pub. Date: Apr. 18, 2002

(65) Prior Publication Data
US 2003/0114959 A1 Jun. 19, 2003

(30) Foreign Application Priority Data
Oct. 11, 2000 (JP) ........................................ 2000-310033

(51) Int. Cl.[7] .............................................. G06F 19/00
(52) U.S. Cl. ........................ 700/245; 700/246; 700/249; 700/250; 700/253; 700/79; 700/80; 700/86; 701/1; 702/183; 707/102; 707/103; 709/318; 171/107
(58) Field of Search ................................. 700/245, 246, 700/249, 250, 253, 79, 80, 86; 701/1; 702/183; 707/102, 103; 709/318; 717/107

(56) References Cited

U.S. PATENT DOCUMENTS 6,157,864 A * 12/2000 Schwenke et al. ............ 700/79
6,526,332 B2 * 2/2003 Sakamoto et al. .......... 700/259
6,560,511 B1 * 5/2003 Yokoo et al. ................ 700/245
6,760,648 B2 * 7/2004 Sakamoto et al. .......... 700/245
2004/0024502 A1 * 2/2004 Squires et al. ................ 701/33

FOREIGN PATENT DOCUMENTS

| EP | 0 855 335 | 7/1998 |
|----|-----------|--------|
| JP | 11-58280 | 3/1999 |
| JP | 2000-210886 | 8/2000 |
| JP | 2000-267852 | 9/2000 |

OTHER PUBLICATIONS

Chen et al., Remote supervisory control of an autonomous mobile robot via world wide web, 1997, IEEE, pp. SS60–SS64.*

* cited by examiner

Primary Examiner—Thomas G. Black
Assistant Examiner—McDieunel Marc
(74) Attorney, Agent, or Firm—Frommer Lawrence & Haug LLP; William S. Frommer

(57) ABSTRACT

To control articulated robots by dynamically modifying a combination of a hardware-dependent middleware layer and a hardware-independent application layer. An interface and a database for semantically performing operation are prepared between a middleware layer which depends upon the hardware configuration of a robot and an application layer which does not depend upon the hardware configuration, thereby making it possible to always guarantee normal operation even if a combination of the middleware and the application which is to be introduced onto the robot is modified. The application can acquire appropriate input data via the middleware, and can issue an appropriate command.

33 Claims, 18 Drawing Sheets

FIG. 1
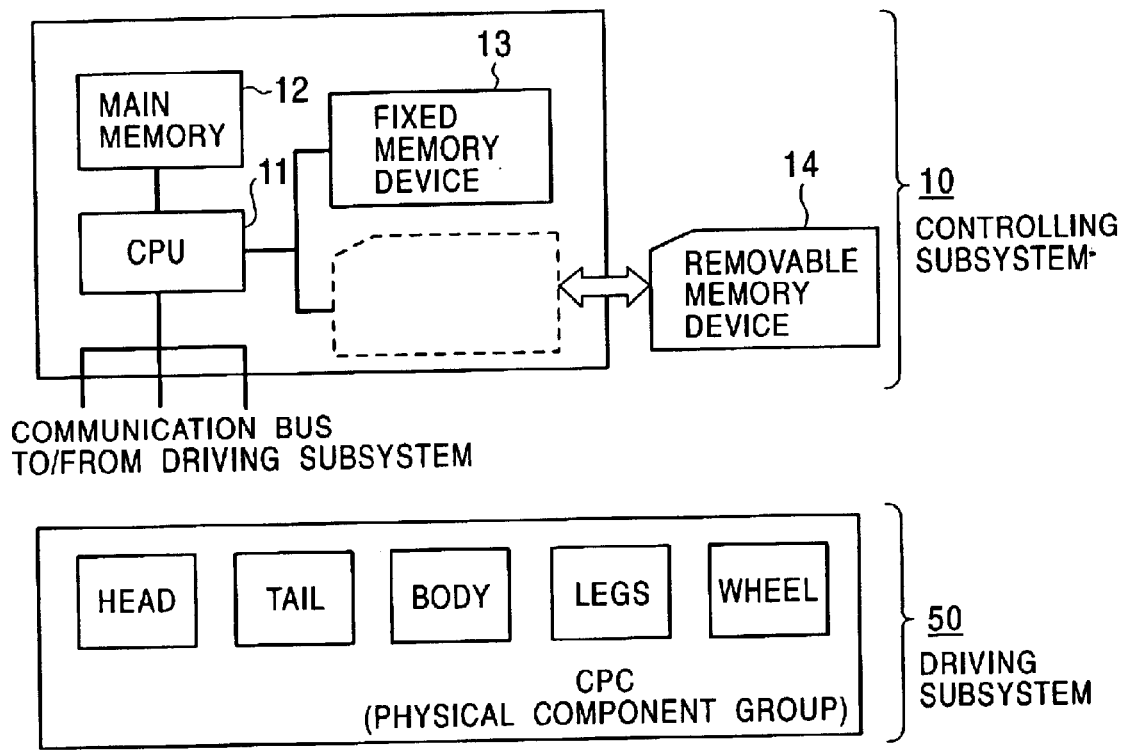
FIG. 2
(a) 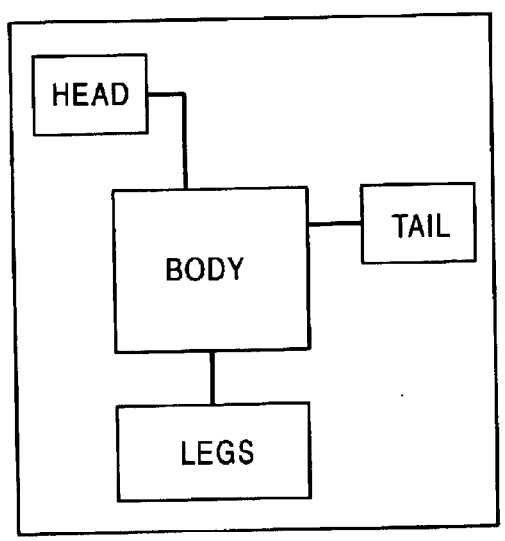
(b) 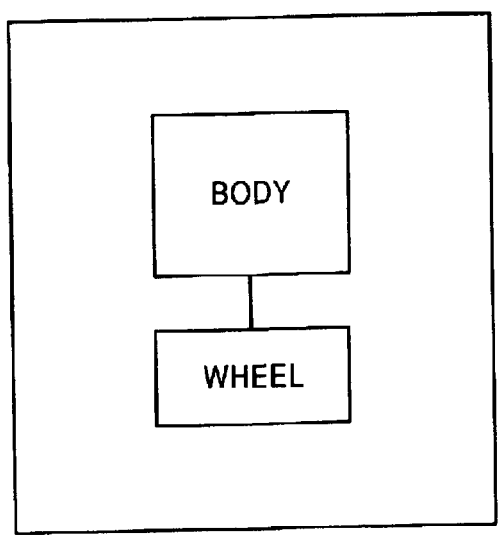

FIG. 4

| InformationID | Classification | | | | Sensor Value Information | | | SensorID | | | |
|---|---|---|---|---|---|---|---|---|---|---|---|
| | Compatibility | Major | Intermediate | Minor | Maximum Value | Minimum Value | Resolution | Compatibility | Part | Compatibility | Site |

FIG. 5

| 100 | 0 | CONTACT | STROKE | CONTACT-PRESSURE TYPE | 0 | 253 | 1 (Pal) | 0 | PRESSURE-SENSITIVE SENSOR | 0 | HEAD |
|---|---|---|---|---|---|---|---|---|---|---|---|
| 101 | 0 | CONTACT | TOUCH | CONTACT-TIME TYPE | 0 | 1024 | 8 (msec) | 0 | SWITCH | 0 | LEGS |
| 102 | 0 | CONTACT | TOUCH | CONTACT-TIME TYPE | 0 | 1024 | 8 (msec) | 0 | SWITCH | 1 | RIGHT FOREPAW |

FIG. 6

| 200 | 0 | DISTANCE | FORWARD | DISTANCE TYPE | 0 | 100 | 0 | 10 (cm) | PSD | 1 | HEAD |
|---|---|---|---|---|---|---|---|---|---|---|---|
| 201 | 0 | DISTANCE | FORWARD | IMAGE-ASSOCIATED TYPE | 0 | 100 | 0 | 10 (cm) | PSD | 1 | HEAD |

FIG. 15

```
struct TargetInfo{
    Time          otime;    // TIME AT WHICH INFORMATION WAS DETECTED
    AppID         target;   // TARGET
    SensorID      sid;      // SENSOR USED
    Tmatrix       matrix;   // CONVERSION MATRIX FROM REFERENCE
                            //   COORDINATE TO SENSOR COORDINATE
    Targetstatus  status;   // Unknown-Lost-NotSupport
    TargetPos     tdata;    // POSITION OF TARGET IN SENSOR COORDINATE
                            //   (POLAR COORDINATE REPRESENTATION)
    Size3D        size;     // SIZE OF TARGET (RECTANGULAR BLOCK)
}
```

FIG. 16

```
enum TargetStatus{
    Found;
    Lost;
    Unknown;
}
```

FIG. 17

```
struct Size3D{
    Enable3D   enable;
    int        width;
    int        hight;
    int        depth;
}
```

FIG. 18

```
bitmap Enable3D{
        bit     FixZero[5];
        bit     First;
        bit     Second;
        bit     3-rd;
}
```

FIG. 19

```
struct CommandInfo{
        Time       otime;     // TIME AT WHICH INFORMATION WAS DETECTED
        AppID      target;    // TARGET
        SensorID   sid;       // SENSOR USED
        Status     status;    // RELATIONSHIP WITH TARGET
        Category   category;  // COMMAND OF INTERACTION (Kick Touch)
        Position3D position;  // RELATIONSHIP BETWEEN TARGET AND CENTER
}
```

FIG. 20

```
enum Status{
     Near;
     Just;
     Far;
}
```

```
struct SysEvent{
    Time        otime;
    Category    category;
    Naction     num;
    ActionID    aid[i];
}
```

| aid[0] | Emergency Stop |
| aid[1] | Gain Off |
| aid[2] | ALLOCATION |

| aid[0] | Emergency Stop |
|--------|----------------|
| aid[1] | ALLOCATION     |

FIG. 26

```
struct PowerEvent{
        Time              otime;
        Category          category;
        ResumeCondition   RecommendCondition;
        Naction           num;
        ActionID          aid[i];
}
```

FIG. 27

```
struct ResumeCondition{
        Mask          mask;
        Event         event;
        ResumeTime    time;
}
```

FIG. 28

| Command-ID | CLASSIFICATION | | | RESOURCE | | | POSTURE INFORMATION | | | SensorID | | | INFINITE EXECUTION Flag | GENERATION ID | DEGREE-ID |
|---|---|---|---|---|---|---|---|---|---|---|---|---|---|---|---|
| COMPATIBILITY | MAJOR | INTERMEDIATE | MINOR | MOTION | SOUND | SPECIAL | START | END | CHANGE | COMPATIBILITY | PART | COMPATIBILITY | SITE | | | |

FIG. 29

| | | | | | | | | | | | |
|---|---|---|---|---|---|---|---|---|---|---|---|
| 100 | 0 | EMOTIONAL EXPRESSION | PLEASANT | PLEASANT | 111 | 1 | 11 | STAND | STAND | PRE-SENT | 0 | DIS-ABLED | 0 | DIS-ABLED | FINITE | 011 | 80 |
| 101 | 0 | EMOTIONAL EXPRESSION | PLEASANT | PLEASANT | 001 | 0 | 00 | SIT | STAND | ABSENT | 0 | DIS-ABLED | 0 | DIS-ABLED | FINITE | 110 | 40 |
| 102 | 0 | EMOTIONAL EXPRESSION | PLEASANT | PLEASANT | 000 | 1 | 11 | ALL POSTURES | ALL POSTURES | ABSENT | 0 | DIS-ABLED | 0 | DIS-ABLED | FINITE | 001 | 10 |

FIG. 30

| 200 | 0 | CONTACT WITH OBJECT | FORWARD | KICK | 001 | 1 | 01 | STAND | STAND | ABSENT | 0 | DISABLED | 0 | LEG | FINITE | 110 | 20 |
| --- | --- | --- | --- | --- | --- | --- | --- | --- | --- | --- | --- | --- | --- | --- | --- | --- | --- |
| 201 | 1 | CONTACT WITH OBJECT | FORWARD | KICK | 001 | 1 | 01 | STAND | STAND | ABSENT | 0 | DISABLED | 1 | LEFT HIND PAW | FINITE | 110 | 100 |

FIG. 33

```
struct Command{
    MW-ID       CommandID;
    TargetID    subjectID;
    TargetPos   tdata;
}
```

FIG. 34

```
struct TargetID{
    SubjectID   SubjectID;
    AppID       appid;
}
```

FIG. 35

```
struct Status{
    MW-ID           CommandID;
    CommandStatus   Cstatus;
    ActionStatus    Astatus;
    PostureID       posid;
    ResourceInfo    resid;
}
```

FIG. 36

```
bitmap ResourceInfo{
    byte    motion RESOURCE-1; // Bitmap of 8 RESOURCES
    byte    motion RESOURCE-2; // Bitmap of 8 RESOURCES
    byte    Speaker RESOURCE;  // Bitmap of 8 RESOURCES
    byte    Special RESOURCE;  // Bitmap of 8 RESOURCES
    //CORRESPONDENCE BETWEEN BITS AND RESOURCES
    IS FREELY DEFINABLE
}
```

ROBOT CONTROL SYSTEM AND ROBOT CONTROL METHOD

TECHNICAL FIELD

The present invention relates to a robot control system for controlling articulated robots, such as legged walking robots, using a software program, and more particularly, it relates to a robot control system for controlling articulated robots, in which the hardware configuration might be significantly modified according to attachment/detachment or replacement of moving units such as legs and a head, using a software program. More specifically, the present invention relates to a robot control system for controlling articulated robots using a software program which comprises a combination of a software layer having a high dependency upon the hardware configuration and a software layer having no dependency upon the hardware configuration, and to a program interface between the software layers, and more particularly, it relates to a robot control system for controlling articulated robots by dynamically modifying a combination of a hardware-dependent software layer, such as middleware, and a hardware-independent software layer, such as an application, and to a program interface between the software layers.

BACKGROUND ART

A mechanical apparatus which utilizes electric or magnetic actions to perform motions which resemble motions of human beings is referred to as a "robot." It is said that the word robot is etymologically derived from the Slavic word ROBOTA (slave machine). In our country, robots have been widely used since the end of the 1960s, but most of them have been manipulators for the purpose of automated or unmanned production operations at factory or industrial robots such as conveyor robots.

Recently, research and development have advanced on the structure and stable walk control of legged mobile robots including pet robots which simulate the physical mechanisms or motions of four-legged walking animals such as dogs and cats, and "human shaped" or "human type" robots (humanoid robots) which simulate the physical mechanisms or motions of biped walking animals such as human beings or apes. Thus, expectations on the practical use thereof have increased. These legged mobile robots are less stable and have more difficult posture control and walk control than crawler robots, but are advantageous in that they can realize flexible walking and running motions such as moving up and down the stairs and leaping over obstacles.

Stationary type robots, like arm type robots, which are installed and used in a particular place, perform activities only in fixed and local working spaces such as part assembling or selecting jobs. On the other hand, mobile robots, whose working spaces are not restrictive, freely move on a predetermined path or out of a path to take on predetermined or arbitrary human operations or to offer various services on behalf of human beings, dogs, or other living things.

One use of legged mobile robots is to take on various difficult tasks in industrial activities, production activities, etc. For example, dangerous jobs or difficult jobs such as maintenance jobs in nuclear power plants, thermal power plants, or petrochemical plants, part conveying and assembling jobs at manufacturing factory, cleaning of tall buildings, and rescues at fires or other sites are taken on, etc.

Other uses of legged mobile robots include living uses, i.e., "coexistent" uses with human beings or "entertainment" uses. Robots of this type emulate a variety of emotional expressions using the motion mechanisms or the extremities of relatively intelligent legged walking animals such as human beings and dogs (pets). Not only are pre-entered motion patterns strictly performed, but vivid expressions which dynamically respond to words or attitudes (such as "praise," "scolding," "hitting," etc.) received from a user (or any other robot) are also demanded.

Conventional toy machines have a fixed relationship between a user operation and a responsive motion, and the motions of the toy cannot be modified according to the preference of users. As a result, users soon get tired of such toys that repeat the same motions.

On the other hand, intelligent robots comprise a behavior model or a learning model which originates from motions, and allows the models to be modified based on external input information, such as voices, pictures, or touch, to determine a motion, thereby realizing an autonomous thought or motion control. Robots which are provided with an emotion model or an instinct model can develop autonomous behaviors according to the robots' own emotions or instinct. The robots are equipped with an image input apparatus or voice input/output apparatus to perform an image recognition process or a voice recognition process, thereby also making it possible to realize realistic communication with human beings at a higher intelligence level.

Recent legged mobile robots have high information processing ability, and these intelligent robots themselves can be thus considered as a kind of computing system.

For example, robots maintain models of various rules for motions, such as an emotion model, a behavior model, and a learning model. According to each of the models, the robots make a behavior plan in response to external factors such as a user's action, and perform the behavior plan by driving jointed actuators or through voice outputs, which can be then fed back to the user. A motion control of the robots for making a behavior plan or performing it on the machine is implemented in the form of executing a program code (for example, an application etc.) on the computing system.

A major difference between a general computing system and a robot is that the former has fewer differences in the kind or combination of hardware components constituting the system (that is, hardware configuration) from system to system, while the latter has a hardware configuration which significantly varies from system to system. For example, there are a variety of kinds of mobile robots, including a robot having movable units attached to a body formed of a head, legs, and a tail, and a robot consisting of a body and a wheel.

In a computing system in which the installed hardware configuration is relatively uniform from system to system, the design of software executed on the system may not be relatively affected by hardware. On the contrary, in of the latter robot case, particularly, a control software layer, such as middleware in which hardware operation is executed, has an extremely high dependency upon hardware.

For example, if a moving control of a robot is considered, the criteria of determining the stability during moving and walking is completely different whether moving means comprises movable legs, or a wheel, or two legs or four legs, and an operating environment in which the application is executed is significantly different from system to system.

If the software development of robots is considered, in view of this circumstance, it seems efficient to discriminate a software layer having a relatively low dependency upon hardware from a software layer having a high dependency upon hardware. In other words, hardware-independent software and hardware-dependent software are separately developed, and a combination thereof is modified to provide a product lineup having a variety of different characteristics and capabilities.

The hardware-independent software is, for example, application layer software in which processing which is less associated with hardware operations such as an emotion model, a behavior model, and a learning model is performed. The hardware-dependent software is, for example, middleware layer software formed of a group of software modules which provide basic features of a robot 1, and the configuration of each of the modules is affected by hardware attributes including the mechanical or electrical characteristics or specifications and the shape of the robot. Roughly, the middleware is functionally classified into recognition middleware which processes and recognizes an input of a sensor of each portion, and then notifies the upper application of this, and by output middleware which performs a control to drive hardware, such as driving of jointed actuators, according to the commands issued by the application.

For example, the same application is executable on robots having different hardware configurations by introducing middleware suitable for the hardware configurations into the robots.

Meanwhile, the manner in which software is introduced into various computing systems represented by robots can include supplying new software via a removable medium, and downloading software over a network. For example, a memory slot in which a removable medium such as a memory card or a memory stick is loaded is provided in a portion on the robot body, thereby only requiring a task of inserting/removing the removable medium to/from the slot in order to readily introduce new software such as an application or middleware into the robot.

To introduce new software into a control system of a robot comprising a plurality of software layers, the newly introduced software must be kept at a good compatibility, i.e., must be compatible, with the other software layers.

More specifically, in order to permit any combination of an application and middleware, a format for which data or commands are exchanged between the software layers, that is, an interface between programs, must be established.

DISCLOSURE OF INVENTION

An object of the present invention is to provide a superior robot control system for controlling articulated robots, such as legged walking robots, using a software program.

Another object of the present invention is to provide a superior robot control system for controlling articulated robots, in which the hardware configuration might be significantly modified according to attachment/detachment or replacement of moving units such as legs and a head, using a software program.

Another object of the present invention is to provide a superior robot control system for controlling articulated robots using a software program which comprises a combination of a software layer having a high dependency upon the hardware configuration and a software layer having no dependency upon the hardware configuration, and to provide a program interface between the software layers.

Another object of the present invention is to provide a superior robot control system for controlling articulated robots by dynamically modifying a combination of a hardware-dependent software layer, such as middleware, and a hardware-independent software layer, such as an application, and to provide a program interface between the software layers.

The present invention has been made in view of the foregoing problems, and a first aspect thereof provides a robot control system for controlling motions of a robot which comprise a combination of a plurality of hardware components including:

a first control unit for performing a process which does not depend upon hardware configuration information of the robot;

a second control unit for performing a process which depends upon the hardware configuration information of the robot; and a communication unit for providing communication between the first and second control units.

As used herein, "system" refers to a logical group of a plurality of apparatuses (or function modules which perform specific functions), and does not particularly refer to the fact that the apparatuses or function modules are accommodated in a single housing or not.

The first control unit used herein is implemented by an application layer software which does not depend upon the hardware configuration. The second control unit is implemented by middleware layer software having a high dependency upon the hardware configuration. The communication unit is mounted in the form of a program interface which realizes a data exchanging process between the application and the middleware.

According to the robot control system in the first aspect of the present invention, the communication unit is an interface between the application layer and the middleware layer, and the format for which data or commands are exchanged between the software layers is established, so that an arbitrary combination of the application and the middleware can be permitted.

The first control unit is realized by, for example, executing application software which determines a behavior sequence of the robot using a model in which the a configuration or motion of the robot is abstracted. The application software includes an emotion model which models an emotion of the robot, an instinct model which models the instinct, a learning model which sequentially stores a causal relationship between an external event and a behavior taken by the robot, a behavior model which models a behavior pattern, etc., by way of example.

The second control unit is realized by executing middleware software which provides a basic onboard function of the robot. The middleware software is formed of, for example, a recognition processor unit which receives input data detected from hardware of the robot via a system control layer to detect external factors such as distance detection, posture detection, and contact, taking account of the hardware configuration, and an output processor unit for processing an onboard motion control for the robot based on a command from the application.

The communication unit notifies the first control unit of the information detected by the recognition processor unit, and transfers the command of the first control unit to the output processor unit.

The communication unit includes an information communication interface which aids in notifying the first control unit of the information from the second control unit, command interface which aids the first control unit in controlling the second control unit, etc.

The communication unit may include an information database in which the first control unit semantically designates information to be retrieved from the second control unit. In such a case, a target record in the information database is registered, so that target information can be transferred from the second control unit to the first control unit.

The communication unit may include a command database in which the first control unit semantically designates a command to be issued to the second control unit. In such a case, the first control unit can use the command database to semantically select a command.

The communication unit may include a feedback interface which aids in notifying the second control unit of the recognition result of the first control unit, and which aids in notifying the first control unit of the relationship between the recognition result and the behavior feasible in the second control unit.

The first control unit and the second control unit may be structured so as to be capable of being independently handled.

The communication unit may notify the first control unit of a system event detected by the second control unit.

The communication unit may also include means for notifying said first control unit of a shutdown factor which is detected by said second control unit, and means for notifying said second control unit of a resume condition with respect to the shutdown which is set by said first control unit. It may further include means for notifying said first control unit of a recommended resume condition which is set by said second control unit.

According to the robot control system in accordance with the first aspect of the present invention, an interface and a database for semantically performing operation are prepared between a middleware layer which depends upon the hardware configuration of a robot and an application layer which does not depend upon the hardware configuration, thereby making it possible to always guarantee normal operation even if a combination of the middleware and the application which is to be introduced onto the robot is modified. The application can acquire appropriate input data via the middleware, and can issue an appropriate command.

A second aspect of the present invention provides a robot control method for controlling motions of a robot which comprise a combination of a plurality of hardware components using a first control module for performing a process which does not depend upon hardware configuration information of the robot, and a second control module for performing a process which depends upon the hardware configuration information of the robot, the robot control method including a communication step of providing communication between the first control module and the second control module.

As used herein, the first control module is implemented by application layer software which does not depend upon the hardware configuration. The second control module is implemented by middleware layer software having a high dependency upon the hardware configuration. The communication step can be implemented in the form of a program interface which realizes a data exchanging process between the application and the middleware.

According to the robot control method in the second aspect of the present invention, in the communication step, an interface between an application layer and a middleware layer is realized to establish the format for which data or commands are exchanged between the software layers, thereby permitting an arbitrary combination of the application and the middleware.

The first control module is implemented by application software which determines a behavior sequence of the robot using a model in which a configuration or motion of the robot is abstracted. The application software is formed of, for example, an emotion model which models an emotion of the robot, an instinct model which models the instinct, a learning model which sequentially stores a causal relationship between an external event and a behavior taken by the robot, a behavior model which models a behavior pattern, etc.

The second control module is implemented by middleware software which provides a basic onboard function of the robot. The middleware is formed of, for example, a recognition processor module which receives input data detected from hardware of the robot via a system control layer to detect external factors such as distance detection, posture detection, and contact, taking account of the hardware configuration, and an output processor module for processing an onboard motion control for the robot based on a command from the application.

In the communication step, the first control module may be notified of the information detected by executing the recognition processor module, and the command by executing the first control module may be transferred to the output processor module.

In the communication step, an information communication interface which aids in notifying said first control module of the information from the second control module may be used.

In the communication step, a command interface which aids the first control module in controlling the second control module may be used.

In the communication step, an information database in which the first control module semantically designates information to be retrieved from the second control module may be used. In such a case, a target record in the information database is registered, so that the target information can be transferred from the second control module to the first control module.

In the communication step, using a command database in which the first control module semantically designates a command to be issued to the second control module, the first control module may semantically select the command.

In the communication step, a feedback loop may be executed to notify the second control module of the recognition result of the first control module, and to notify the first control module of the relationship between the recognition result and the behavior feasible in the second control module.

The first control module and the second control module may be structured so as to be capable of being independently handled.

The communication step may include a substep of notifying the first control module of a system event detected by the second control module.

The communication step may include a substep of notifying the first control module of a shutdown factor which is detected by the second control module, and a substep of notifying the second control module of a resume condition with respect to the shutdown which is set by the first control module. The communication step may further include a substep of notifying the first control module of a recommended resume condition which is set by the second control module.

According to the robot control method in the second aspect of the present invention, an interface and a database for semantically performing operation are prepared between a middleware layer which depends upon the hardware configuration of a robot and an application layer which does not depend upon the hardware configuration, thereby making it possible to always guarantee normal operation even if a combination of the middleware and the application which is to be introduced onto the robot is modified. The application can acquire appropriate input data via the middleware, and can issue an appropriate command.

A third aspect of the present invention provides a robot control system which is configured by an object-oriented program, including:

an application object for executing a process which does not depend upon a hardware configuration of a robot;

a middleware object for executing a process which depends upon the hardware configuration of the robot;

an information database registered with information which is used for said middleware object and which corresponds to a semantic command from said application object; and object control means for controlling communication between said application object and said middleware object on the basis of said information database.

The information database may hierarchically describe a semantic aspect of the registered information. Preferably, the format of said information database at least includes an information identification information field, a classification field, and a sensor information identification field.

Other objects, features, and advantages will be apparent from a more detailed description of the following embodiments of the present invention or in conjunction with the accompanying drawings.

BRIEF DESCRIPTION OF THE DRAWINGS

FIG. 1 is a view schematically showing a hardware configuration of a robot in accordance with an embodiment of the present invention.

FIG. 2 is a view showing an example modification of the configuration of a driving subsystem 50 by attaching/detaching or replacing CPC components.

FIG. 4 is a view showing an example format of an information database.

FIG. 5 is a view showing an example entry of records in the information database.

FIG. 6 is a view showing an example entry of records in the information database.

FIG. 15 is a view schematically showing the data structure of target information (TargetInfo) which is used in the feedback loop.

FIG. 16 is a view schematically showing the data structure of TargetStatus indicating the status of a target.

FIG. 17 is a view schematically showing the data structure of Size 3D indicating the size of the target in a rectangular block form.

FIG. 18 is a view schematically showing the data structure of a variable Enable 3D in FIG. 17.

FIG. 19 is a view schematically showing the data structure of command information (CommandInfo) which is used in the feedback loop.

FIG. 20 is a view schematically showing the data structure of Status indicating a relationship with the target.

FIG. 26 is a view schematically showing the data structure of shutdown factor PowerEvent which the middleware object notifies the application object of.

FIG. 27 is a view schematically showing the data structure of shutdown factor PowerEvent which the middleware object notifies the application object of.

FIG. 28 is a view showing an example format of a command database.

FIG. 29 is a view showing an example entry of records in the command database.

FIG. 30 is a view showing an example entry of records in the command database.

FIG. 33 is a view schematically showing the data structure of the command issued by the application object.

FIG. 34 is a view schematically showing the data structure of Target 1D.

FIG. 35 is a view schematically showing the data structure of Target 1D.

FIG. 36 is a view schematically showing a data improvement of resource information (ResourceInfo).

BEST MODE FOR CARRYING OUT THE INVENTION

Figure 3:
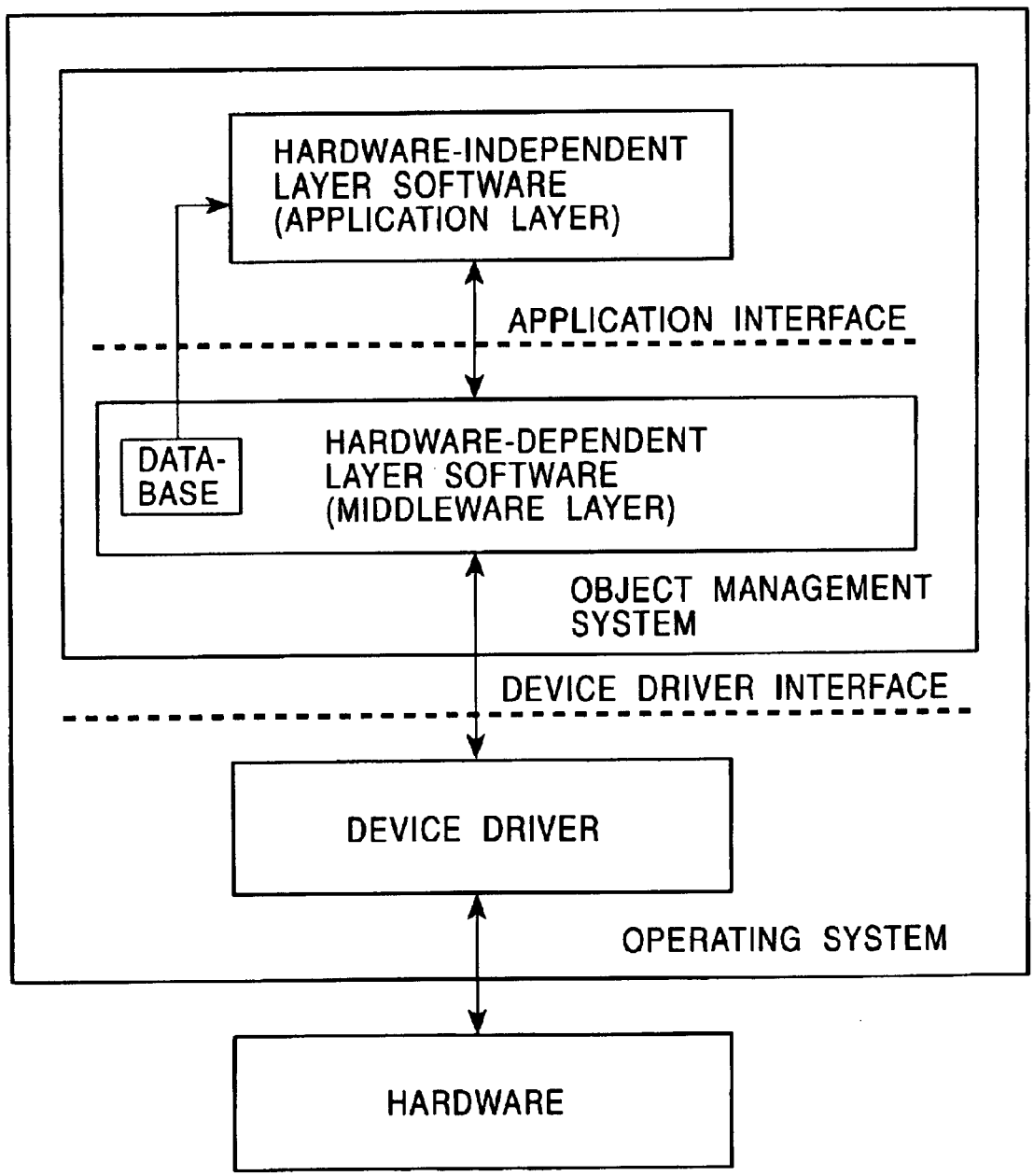
FIG. 3 is a view showing an example modification of the configuration of a driving subsystem 50 by attaching/detaching or replacing CPC components.

Hereinbelow, embodiments of the present invention will be described in detail with reference to the drawings.

FIG. 1 schematically illustrates the hardware configuration of a robot in accordance with an embodiment of the present invention. As shown in the same figure, hardware of the robot is formed of a controlling subsystem 10 and a driving subsystem 50.

The controlling subsystem of the robot is constituted by a CPU (Central Processing Unit) 11, a main memory 12, a fixed memory device 13, and a removable memory device 14.

The CPU 11 as a main controller is adapted to comprehensively control operation of the overall apparatus, i.e., the robot, by executing hardware-independent program, such as an application, or a hardware-dependent program, such as middleware, under a control of system control software.

The CPU 11 is connected via a bus to the memory or other circuit components or peripherals. A unique address (memory address or I/O address) is allocated to each of the devices on the bus, and the CPU 11 can communicate with a specific device on the bus by addressing it. The bus is a common signal transmission path including an address path, a data path, and a control path.

The main memory 12 typically comprises a volatile storage device including a plurality of DRAM (Dynamic Random Access Memory) chips, and is used to load execution program codes of the CPU 11 or to temporarily save the work data thereof. In the present embodiment, a program code such as an application or middleware, which is supplied from the fixed memory device 13 or the removable memory device 14, is loaded onto the main memory 12, that is, mapped onto the memory space.

The fixed memory device 13 is a non-replaceable and non-volatile storage device which is fixedly mounted to the robot body. For example, like a flash memory, by applying a write voltage, a programmable non-volatile memory element may be used to constitute the fixed memory device 13.

The fixed memory device 13 is used to store a program code such as an application for controlling the motion or thought of the robot and middleware for hardware operation. Since the fixed memory device 13 is fixedly installed to the apparatus, preferably, a version of hardware-dependent software such as middleware, which supports the hardware configuration at time of delivery of the robot (default) or the standard hardware configuration, is prepared in the fixed memory device 13.

The removable memory device 14 is a non-volatile storage device which is attachably/detachably or replaceably mounted to the robot. For example, the removable memory device 14 is formed using a cartridge type storage medium such as a memory card or a memory stick, and it is loaded into a predetermined memory slot for replaceable use on the machine.

As in the fixed memory device 13, the removable memory device 14 is used to store a program code such as an application for controlling motions or thoughts of the robot and middleware for hardware operation. However, the removable memory device 14 is provided so as to be attached/detached to/from or replaced with respect to the robot body, and can be used when up-to-date software is provided to the machine since it is expected that it moves from machine to machine having different hardware configurations for use.

There is lower necessity to store hardware-dependent software, such as middleware, in the removable memory device 14, in particular, with the consciousness of whether or not it is a version supporting the hardware configuration at time of delivery of the robot (default) or the standard hardware configuration. Rather, preferably, the middleware capable of providing an operating environment to the hardware configuration assumed by the application is stored in the removable memory device 14 together with the application.

On the other hand, the driving subsystem 50 of the robot includes jointed actuators, driving control circuits thereof, an encoder for detecting motions, and various kinds of sensors such as a camera and contact sensors (all the components are not shown). In the example shown in the figure, the driving subsystem 50 is handled per unit of driving units such as the head, the body, and the legs.

Furthermore, at least a portion of the driving units is formed as a physical component (CPC: Configurable Physical Component) which can be dynamically reconfigured by attaching/detaching or replacing it to/from or with respect to the machine.

In the present embodiment, unique identification information, that is, a component ID, is allocated to each of the physical components. The CPU 11 (more specifically, system control software executed on the CPU 11) in the controlling subsystem 10 accesses each of the mounted physical components via the bus to transfer a control command to each of the physical components or to acquire the respective component IDs. A detected combination of the component IDs correspond to current hardware configuration information of the robot.

FIG. 2 illustrates an example modification of the configuration of the driving subsystem 50 by attaching/detaching and replacing the CPC components. In FIG. 2(a), a plurality of physical components such as the head, the legs, and the tail are attached to the body (that is, the hardware configuration information is {body ID, head ID, leg ID, tail ID}), and in FIG. 2(b), only a wheel is attached to the body as a physical component (that is, the hardware configuration information is {body ID, wheel ID}).

As in the example shown in FIG. 2(a) and FIG. 2(b), the same hardware-dependent software cannot be used in robots having significantly different hardware configurations. For example, the middleware which performs a sensor input from the head or the tail cannot run on the apparatus having the hardware configuration shown in FIG. 2(b). Similarly, the middleware which is designed so that the legs are drivingly controlled as moving means cannot be used on the apparatus having the hardware configuration shown in FIG. 2(b).

Next, the configuration of the robot control software will be described with reference to FIG. 3.

The robot control software is formed of an application layer which does not depend upon the hardware configuration of the robot, a middleware layer which depends upon the hardware configuration, and a device driver at the bottom layer. The software of each layer controls the hardware of the robot, that is, the driving subsystem 50 as described later, under a control of a predetermined operating system (OS).

In the present embodiment, the design of the software of each layer may employ object-oriented programming. Each object-oriented software is handled in the unit of module of "object" which integrates the data with the procedure associated with the data.

Data is communicated between the application layer and the middleware layer via a predetermined programming interface (hereinafter referred to as "application interface"). In the present embodiment, a variety of combinations of the application and the middleware are permitted by introducing the software via the removable memory device 14, etc. Each compatibility of the application with the middleware is realized by the application interface. The mechanism of the application interface is described later in detail.

The application layer and the middleware layer are each formed of a plurality of object files. In the present embodiment, the application layer and the middleware layer are under a control of an object management system. Data is communicated between the middleware layer and the device driver at the bottom layer via a predetermined programming interface (hereinafter referred to as "device driver interface").

The hardware operations, such as an issuance of control commands to jointed actuators for driving and an entry of detection values in sensors, are performed not directly by the middleware but via the respective device drivers corresponding to the hardware components.

The application comprises an emotion model which models emotions of the robot, an instinct model which models the instinct, a learning model which sequentially stores causal relationships between external events and behaviors taken by the robot, and a behavior model which models behavior patterns, so that an output destination of the behavior determined by the behavior model based on the sensor input information, i.e., the external factors, can be changed.

The emotion model and the instinct model have a recognition result and a behavior record at inputs to manage an emotion value and an instinct value, respectively. The behavior model can refer to the emotion value and the instinct value. The learning model updates the behavior selection probability based on the teaching of the learning from the outside (operator) to provide the updated contents to the behavior model.

The application performs a calculation using a model in which configurations or motions of the robot are abstracted, and is thus hardware-independent software which is not affected by hardware attributes.

The middleware layer comprises a group of software modules which provide basic onboard functions of the robot, and the configuration of each of the modules includes hardware-dependent software which is affected by hardware attributes including mechanical or electrical characteristics or specifications, and the shape of the robot.

The middleware layer can be functionally classified into recognition middleware and output middleware.

The recognition middleware receives raw data from the hardware, such as image data, audio data, and other detection data obtained from the sensors, via the system control layer, and processes them. That is, processes such as voice recognition, distance detection, posture detection, contact, motion detection, and color recognition are performed based on the various input information to obtain recognition results (for example, ball was detected, tumbling was detected, stroked, hit, sounds of do-mi-so were heard, a moving object was detected, an obstacle was detected, an obstacle was recognized, etc.). The recognition result is sent to the upper application layer, and is used to make a behavior plan, etc.

On the other hand, the output middleware provides functions including walking, reproduction of motions, synthesis of output sounds, and a control to emit LEDs that are located correspondingly to eyes. That is, in response to a command which is associated with the behavior plan made by the application layer, a servo instruction value or output sound, emitted light (LEDs), and output voice of joints of the robot are generated for each of the functions, and are played on the robot via an output, namely, a virtual robot. With such a mechanism, abstract behavior commands (for example, to advance, to recede, to be pleasant, to bark, to sleep, to do exercise, to be surprised, to track, etc.) are given from the application side, thereby making it possible to control the motions by the jointed actuators of the robot or other onboard output units.

The middleware according to the present embodiment prepares semantic information communication between the application and the middleware, and can share an intelligence base. The database contains an information database (informationDB) which is used by the application to semantically designate input information, and a command database (CommandDB) which is used by the application to semantically select an execution command. The detail of the databases will be described later.

The software of each robot control layer is supplied to the inside of the machine of the robot 1 by the fixed memory device 13 or the removable memory device 14. The software of each layer is loaded onto the main memory 12, namely, is mapped on the memory space, for use.

In the present embodiment, the application interface is interposed and defined between the middleware layer which depends upon the hardware configuration of the robot, and the application layer which does not depend upon the hardware configuration such as behavior selection. Therefore, the following functions can be satisfied.

(1) The middleware and the application are structured so as to be independently handled, so that a single application can support robots having different hardware configurations (a user can move his owned (or bred) application from machine to machine or can distribute or sell it).

(2) The middleware and the application are structured so as to be independently handled, so that middleware supporting various applications can be created on a machine having a single hardware configuration. The reusability of the middleware is enhanced, and the development efficiency of the application is therefore improved.

(3) The middleware and the application are structured so as to be independently handled, so that improvements of the actual expression capability and the controllability of the same application may be achieved on a machine having the same hardware configuration by modifying the middleware.

(4) Since binary compatibility is guaranteed, the above-described advantages can be enjoyed by downloading binary codes of the application or the middleware from the removable memory device 14 such as a memory stick to the machine to easily replace software. In addition, software may be exchanged without any compiling work.

(5) Since the application and the middleware are independent, software developing vendors can devote themselves to function development of their own fields. For example, a vendor which specializes a control system concentrates on the development of middleware, so that a variety of applications may be used.

The application interface according to the present embodiment comprises function implementation means as follows.

(1) An information communication interface (SensorInformation+SensorValueVector/SystemInfo/Boot/Shootdown) which aids in notifying the application of information detected by the middleware.

(2) A command interface (Command/Status) which aids the application in controlling the middleware.

(3) A feedback interface (TargetInfo/CommandInfo) which aids in notifying the middleware of the recognition result detected by the application, and which aids in notifying the application of the relationship between the recognition result and the behavior feasible in the middleware.

(4) Means for semantically selecting information used by the application among the data supplied by the information communication interface.

This semantically selecting means allows the application to acquire input information (for example, "stroked" by a user, etc.) for learning without the consciousness of the actual location of a sensor as an information source. If expected hardware such as sensors and switches were not present onboard, alternative sensors could be selected (for example, some switch disposed on the head is alternatively used to perceive as being "stroked," etc.) and associated with corresponding emotion (for example, pleasant emotion).

The middleware prepares an information database InformationDB (as described later) to semantically designate input information. The application registers information used for InformationDB, so that semantic acquisition of the input information can be realized.

(5) Means for semantically selecting a command to be executed on the application among the commands supported by the command interface.

This semantically selecting means allows the application to execute a necessary behavior without the consciousness of which motor/effector is to be actually activated by the middleware.

The middleware is provided with a command database CommandDB (as described later) to semantically realize a command selection.

(6) Means for providing robot information, necessary for recognition by the application, which dynamically changes during execution.

For example, a HeaderInfo field (as described later) is defined in SensorInformation to provide information on the posture or motion speed of the robot.

(7) Means for providing sensor physical information, necessary for recognition by the application, which dynamically changes during execution.

For example, a HeaderInfo field in the SensorInformation, and a SensorInfo field are used to announce which direction the sensor is oriented in.

(8) Means for providing physical information, such as the size and motion speed of the robot, which is necessary to realize a moving behavior using the application.

For example, information on whether or not the robot having the current hardware configuration can pass through a space detected, etc., is provided to a TargetPos•application layer of Command.

(9) Means for announcing a previously prepared behavior, which is associated with the information input from the information communication data, using a command interface in order to constitute a reflection loop which does not depend upon the structure.

Classes of an Interaction system are prepared to search CommandDB using SensorID of the input information as Key.

(10) Means for asking the application to execute a command according to the convenience of the middleware.

For example, by making it possible to handle a process, such as a recovery operation from tumbling, which changes depending upon the configuration of the middleware, without need for the application layer to understand the detail, the statuses of the middleware and the application can be matched.

Additionally speaking with respect to tumbling, a method for recovering from the tumbling posture, i.e., through what posture it can safely stand, varies depending upon the kind of posture that is supported by the middleware. Of course, this also depends upon the capabilities of the middleware.

(11) Means for announcing a shutdown (Shutdown) and a resume (Resume) condition.

Shutdown factors and resume conditions are closely influenced. For example, if the temperature of a battery during discharging is too high, the time required for the temperature to drop to an appropriate temperature depends upon the characteristics of the machine such as a heat dissipation capability of hardware. As the resume condition at this time, the middleware notifies the application of the time at which it may occur next as a recommended resume condition. The application sets the final resume condition from the recommended condition and at convenience of the application itself, and notifies the middleware of it at time of shutdown. (Shutdown/Resume Condition)

(12) Means for utilizing the recognition result of the application under a control of the middleware.

By adding the recognition result, output service, to the Tracking command in the application layer, a software module which handles Tracking of the middleware can acquire the recognition result designated from the recognition result service without intervention of the software whose command has been determined at an application layer, thereby increasing the speed of processing. (TargetID of TargetInfo/Command)

(13) Means for allowing the system to automatically search a parameter, which may be modified according to the hardware configuration, to notify the middleware of this.

For example, even new hardware configuration would not require software modification, but only require replacement of parameter files. The system may sometimes search a ROM mounted on the physical components and announce the information.

The function provided by this means improves versatility, which also influences binary compatibility.

Hereinafter, representative function implementation means of the application interface is described in detail.
Information Database (InformationDB)

In the present embodiment, information used by the application can be semantically selected in the data supplied via the application interface. For this reason, the middleware prepares an information database. The application registers the used information in the information database in a semantic basis, thereby making it possible to acquire necessary input information.

The application can acquire input information (for example, "stroked" by a user, etc.) for learning without the consciousness of the actual location of a sensor as an information source. If expected hardware such as sensors and switches were not present onboard, alternative sensors could be selected (for example, some switch disposed on the head is alternatively used to perceive as being "stroked," etc.) and associated with corresponding emotion (for example, pleasant emotion).

FIG. 4 shows an example format of the information database. As shown in the same figure, one record in the information database is formed of an information identification information (InformationID) field, a classification field, a sensor value information field, and a sensor identification information (SensorID) field.

The information identification information (InformationID) is a unique identifier which is uniquely allocated to a record, and can be determined at the discretion of the middleware.

The classification field is further divided into subfields of compatibility, major, intermediate, and minor. The compatibility subfield is a flag indicating that the ID written subsequently thereto is meant by either standard or extended ID. A major classification, an intermediate classification, and a minor classification are filled in the major, intermediate, and minor subfields, respectively.

With the consciousness of semantic selection of the information, that is, the classification is such that the semantic aspect of the information is hierarchically described. By selecting the necessary information after the database is read, the operation using a combination of different databases is possible. The minor subfield is in the form of the actual hardware configuration (the unit system etc. are determined at this time).

The sensor value information field includes subfields in which the maximum value, the minimum value, and the resolution of a target sensor input are filled.

The sensor identification information (Sensor ID) field includes subfields in which sensor parts and sites on which the sensors are mounted are designated, and flags indicating compatibility of the parts and sites.

The classification and the sensor identification information are keys to select a target record when the database is searched.

Software such as the application searches the information database of the middleware which is combined at time of execution to retrieve necessary information identification information, and information is extracted from the information group which is announced during operation using the information identification information as a search key to apply necessary processing.

FIGS. 5 and 6 illustrate example entries of record in the information database.

In each of the figures, the records of the information IDs 101 and 102 substantially designate the same sensor. Similarly, the records of 200 and 201 substantially designate the same sensor. More detailed site information is described in 102 than in 101. 201 is different from 200 in that a relationship between the location measured by a PSD and the location captured by a camera is obtained as an image-associated type.

The application uses this information database to register input information to be used, thereby making it possible to receive announcement of the target sensor input information from the middleware.

Figure 7:
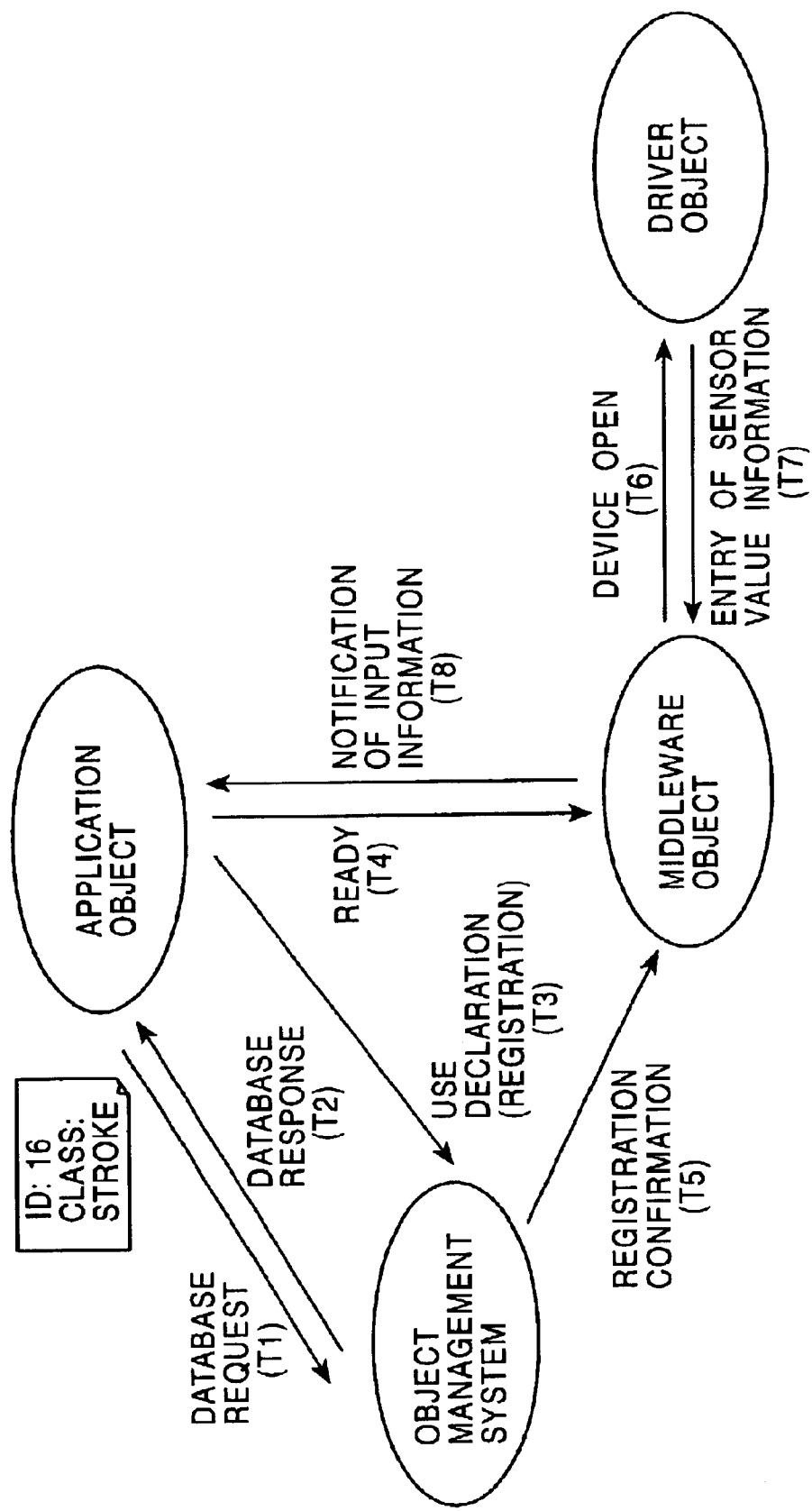
FIG. 7 is a view schematically showing the manner how information used by an application is registered, and the manner how the registered information is announced through middleware.

FIG. 7 schematically shows the manner how an application object registers information to be used, and the manner how the application object is notified of the registered information via a middleware object. Hereinbelow, the mechanism in which the application object registers the used information and the mechanism in which the registered information is received by the application object will be described with reference to the same figure.

The application object issues a semantic database request of "stroke" to the object management system, for example, when sensor value information on "stroke" is to be used (T1).

In response to this database request, the object management system searches the information database using the semantic class of "stroke" as a search key. Then, the target record is found, and the information identification information thereof is returned to the application object of the requesting source (T2).

The application object make a declaration (namely, registration) to the object management system that this information is used if the returned value is satisfied (T3), and notifies the middleware object of the ready state, namely, that an input of the target sensor value information is acceptable (T4). In response to the declaration, the object management system makes a registration confirmation to the middleware object (T5).

In response to the registration confirmation, the middleware object instructs the driver object which performs a hardware operation of the sensor designated by the target record in the information database to activate the sensor (that is, sensor open) (T6).

As a result of sensor open, the middleware object can enter sensor value information at any time (T7). The middleware object collectively announces the input information from the sensors for each application object according to the registered contents (T8).

Sensor Value Information (Sensor Information)

The mechanism in which the application object uses the information database to register the used information to enable the desired sensor value information to be input has been described above. Next, the mechanism in which the application object acquires the sensor value information, and the detail of the sensor value information are described.

Figure 8:
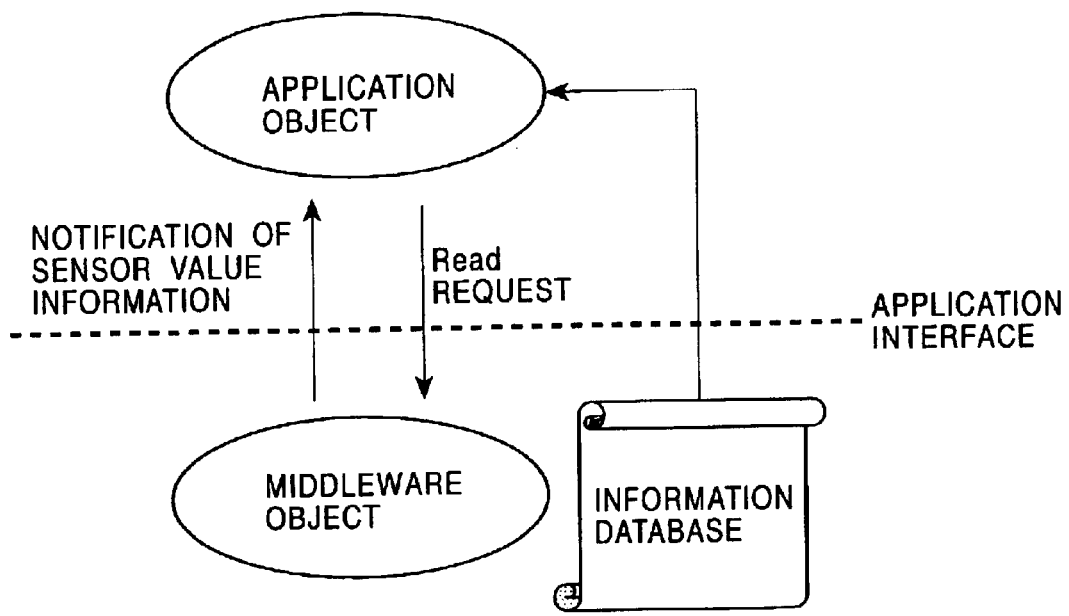
FIG. 8 is a view showing the mechanism in which an application object requests sensor value information to a middleware object.

FIG. 8 illustrates the mechanism in which the application object requests the sensor value information to the middleware object.

The application object can acquire information identification information (Information ID) based on the information database to obtain necessary information.

The application object uses this information identification information to issue a data read (Read) request to the middleware object. In response to this Read request, the middleware object notifies the application object of the sensor value information input via the driver object.

Figure 9:
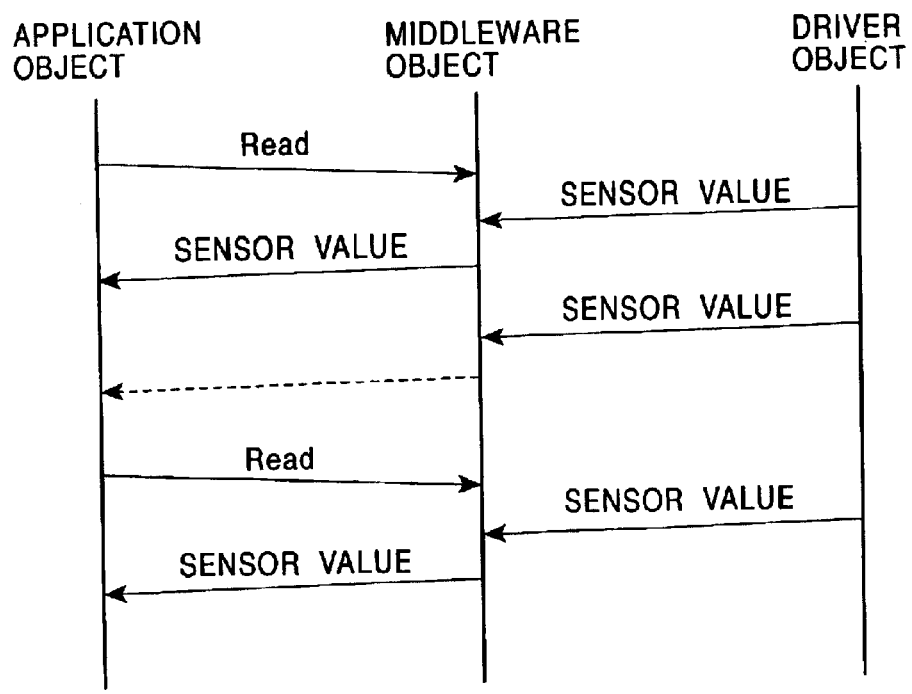
FIG. 9 is a chart schematically showing communication between the objects in order for the application object to acquire the sensor value information.

FIG. 9 schematically shows, on a chart, communication between the objects when the application object acquires the sensor value information.

As shown in the same figure, the application object issues the Read request to the middleware object when it requires the sensor value information.

The middleware object receives sensor values from the sensors via the driver object. In response to the Read request from the application object, it returns the sensor value associated with the requested information identification information to the application object. However, the sensor values which are input when the application object is not ready are not transferred to the application object, but are discarded.

Figure 10:
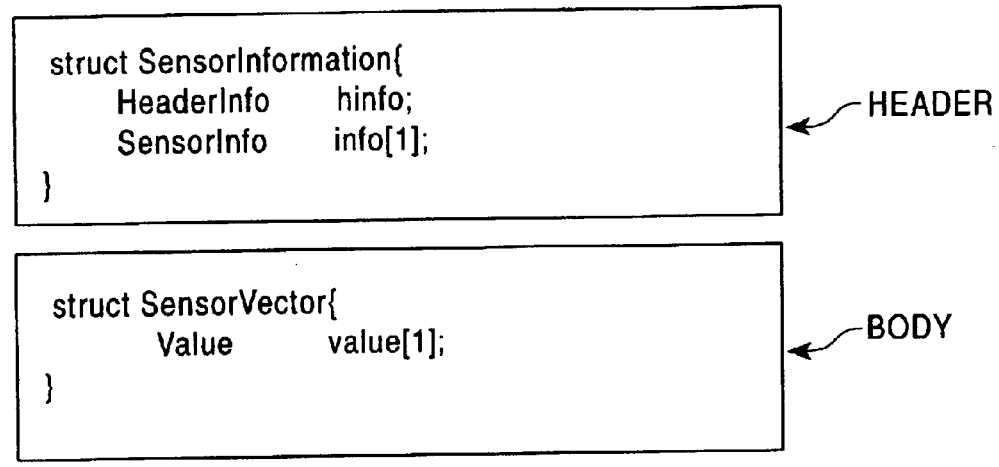
FIG. 10 is a view schematically showing the data structure of the sensor value information.

FIG. 10 schematically illustrates the data structure of the sensor value information. As shown in the same figure, the sensor value information is formed of a header and a body.

The header is constituted by header information (HeaderInfo) and sensor information (SensorInfo). Information of the type which cannot be described in the information database and which changes during motions can be added to the header.

Since a plurality of pieces of information are delivered at one time, the target header can be searched for using the information identification information. An offset to value information is written into the retrieved header. The value comprises a data stream, and the target sensor value can be extracted from the header information and the sensor information.

Figure 11:
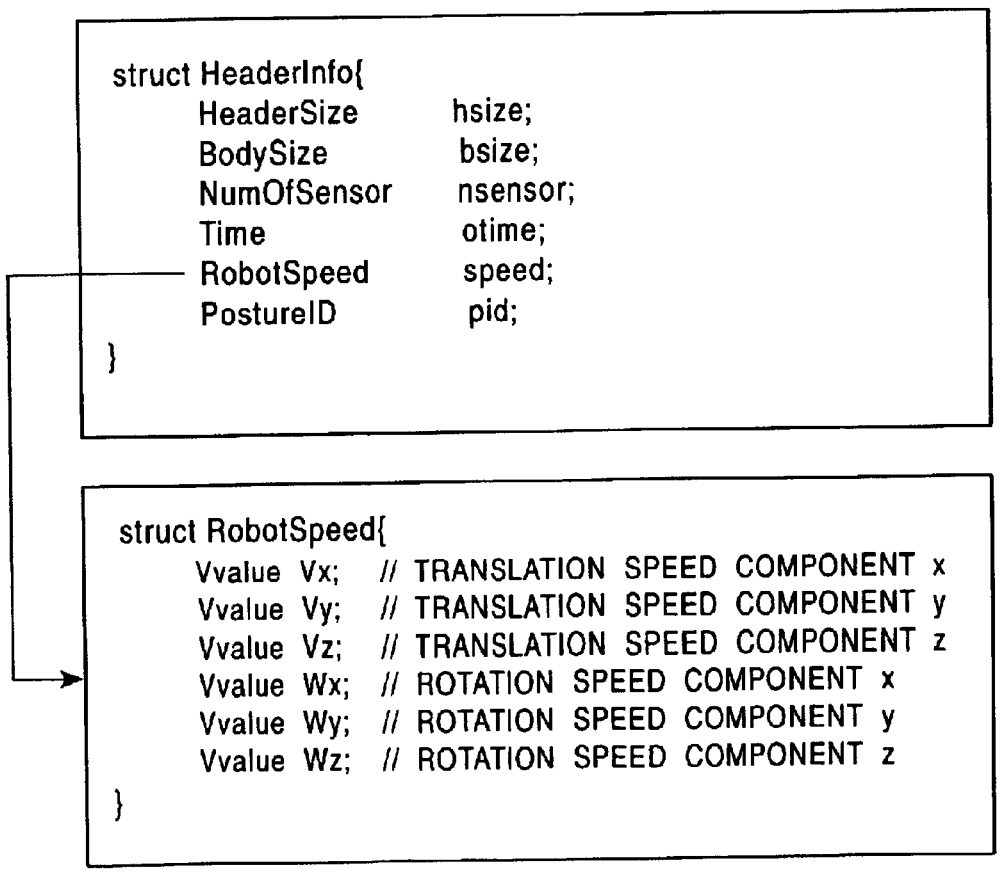
FIG. 11 is a view schematically showing the data structure of header information.

FIG. 11 schematically illustrates the data structure of the header information. As shown in the same figure, the header information is constituted by header size (HeaderSize), body size (BodySize), the number of sensors (NumOfSensor), time (Time), robot speed (RobotSpeed), and posture identification information (PostureID).

The robot speed (RobotSpeed) has translation speed components and rotation speed components written in each of the x, y, and z axes, as shown in the same figure.

The posture identification information (PostureID) uses what is defined as the common concept. The posture identification information is defined as the following data structure.

TypeDef PostureID Byte

Figure 12:
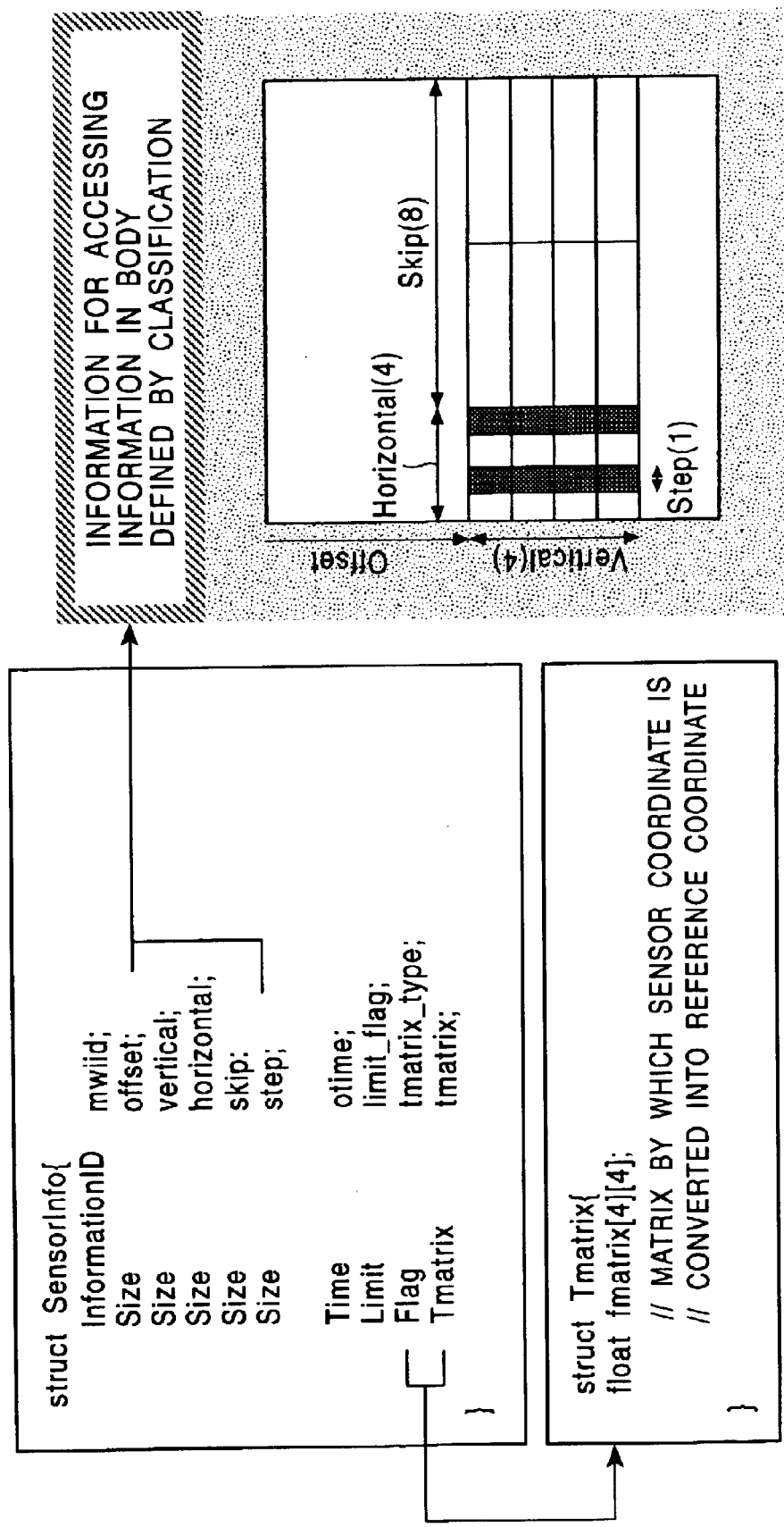
FIG. 12 is a view schematically showing the data structure of sensor information (SensorInfo).

FIG. 12 schematically shows the data structure of the sensor information (SensorInfo). The format of the body can be described in the sensor information (SensorInfo).

The sensor information (SensorInfo) includes information identification information (information ID), and information for accessing information defined from the body by classification. The information for accessing the body is constituted by the amount of offset of the body (offset), the vertical size (vertical), and the horizontal size (horizontal), and the number of skips (skip), the number of steps (step), etc.

otime indicates the time at which this sensor value information was detected, and is affected by a delay time of a filter, etc. Limit is a flag indicating whether or not the sensor itself cannot move since it is located at the end point.

Figure 13:
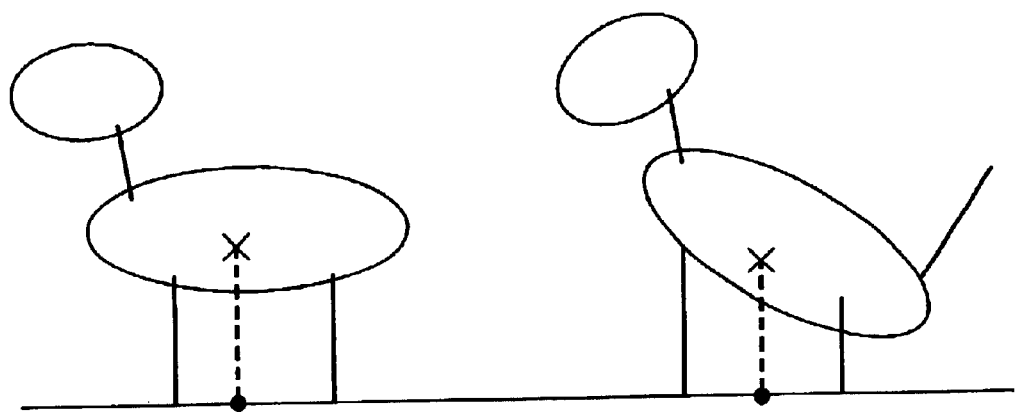
FIG. 13 is a view showing the manner how a sensor is converted into the position on the reference coordinate by Tmatrix.

Tmatrix is information indicating the status of the sensor. More specifically, it is a 4×4 matrix used to convert the sensor coordinate into the reference coordinate. The manner how the sensor is converted into the position on the reference coordinate by Tmatrix is shown in FIG. 13.

Feedback Interface

The application interface according to the present embodiment achieves a feedback loop through which the middleware is notified of the recognition result detected by the application, and through which the application is notified of the relationship between the recognition result and the behavior feasible in the middleware. An interface for the feedback loop, namely, "feedback interface" is mounted.

Figure 14:
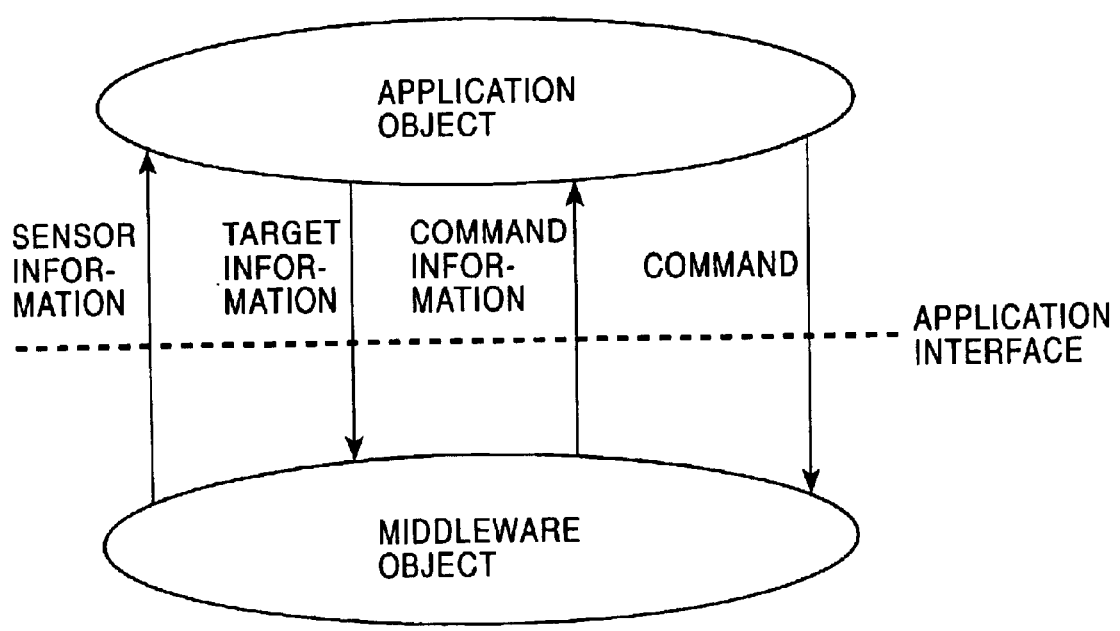
FIG. 14 is a view showing the manner how the application object issues a command according to command information which is announced through a feedback loop using a feedback interface.

FIG. 14 illustrates the manner how the application object issues a command according to the command information which is announced through the feedback loop using the feedback interface.

The middleware object transmits sensor value information such as image data to the application object based on the registered contents of the specification information.

In response, the application object recognizes a predetermined target based on the sensor value information, and returns the target information (TargetInfo) in a object form as a recognition result to the middleware object.

Furthermore, the middleware object feeds command information (CommandInfo) concerning a possible interaction with the target back to the application object.

The application object selects a selectable command based on the command information, and issues the command to the middleware object. The middleware object performs a predetermined hardware operation via the driver object so that the command can be implemented on the robot machine.

FIG. 15 schematically shows the data structure of the target information (TargetInfor) used in the feedback loop.

As shown in the same figure, the target information is constituted by Time indicating the time at which the information was detected, AppID used to identify the target to be tracked, SensorID used to identify the sensor used, Tmatrix which is a conversion matrix from the reference coordinate to the sensor coordinate, TargetStatus indicating the status of the target (either Unknown, Lost, or NotSupport status is taken) (see FIG. 16), TargetPos indicating, in the form of polar coordinate, the position of the target in the sensor coordinate system, and Size 3D indicating the size of the target in a rectangular block form (see FIG. 17; with respect to the data structure of a variable Enable 3D in FIG. 17, see FIG. 18).

FIG. 19 schematically shows the data structure of the command information (CommandInfo) used in the feedback loop.

As shown in the same figure, the command information is constituted by Time indicating the time at which the information was detected, AppID used to identify the target to be tracked, SensorID used to identify the sensor used, Status indicating a relationship with the target (see FIG. 20), Category indicating the command of the interaction (that is, selectable command), and Position 3D indicating a relationship between the target and the center.

A command in a Kick-Touch system varies in a different manner depending upon the configuration of the robot. Tracking, etc., are handled as fixed commands.

The command information shown in FIG. 19 is of the type which provides versatility of selection using Category. An example modification can include the type which provide no versatility, represented by a CommandID stream, in which ActionID is designated.

System Event

Figures 21, 22, 23:
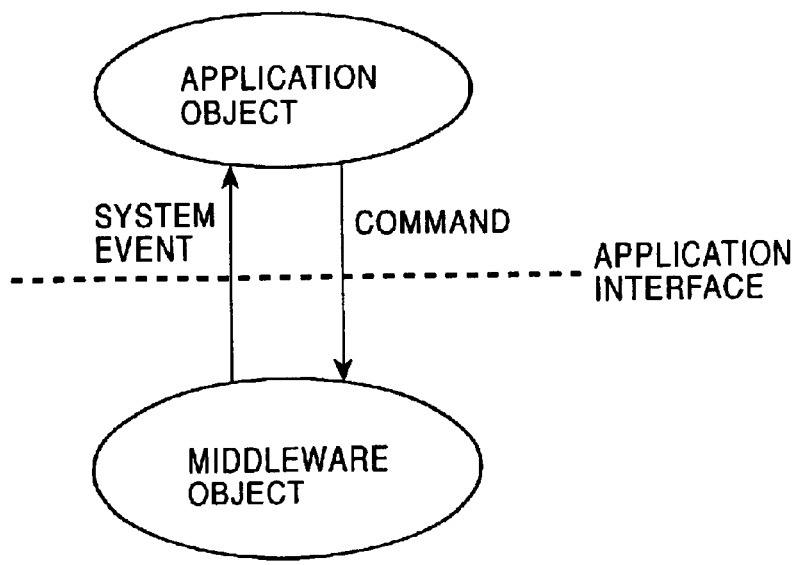
FIG. 21 is a view schematically showing processing of a system event via the application interface.
FIG. 22 is a view schematically showing the data structure of a system event (SysEvent).
FIG. 23 is a view showing an example usage of aid.

The application interface according to the present embodiment comprises a mechanism which, when a predetermined event generated on the robot machine, namely, a system event, is detected, notifies the application object of this. In response to the notification of the system event, the application object executes a predetermined command. FIG. 21 illustrates the processing of the system event via the application interface.

FIG. 22 schematically shows the data structure of the system event (SysEvent) which is used by the middleware object to notify the application object of the event.

As shown in the same figure, the system event is constituted by Time indicating the time at which the event occurred, Category indicating a command of the interaction (that is, selectable command), Naction indicating the number of actions, and ActionID indicated by a CommandID stream.

Figures 24, 25:
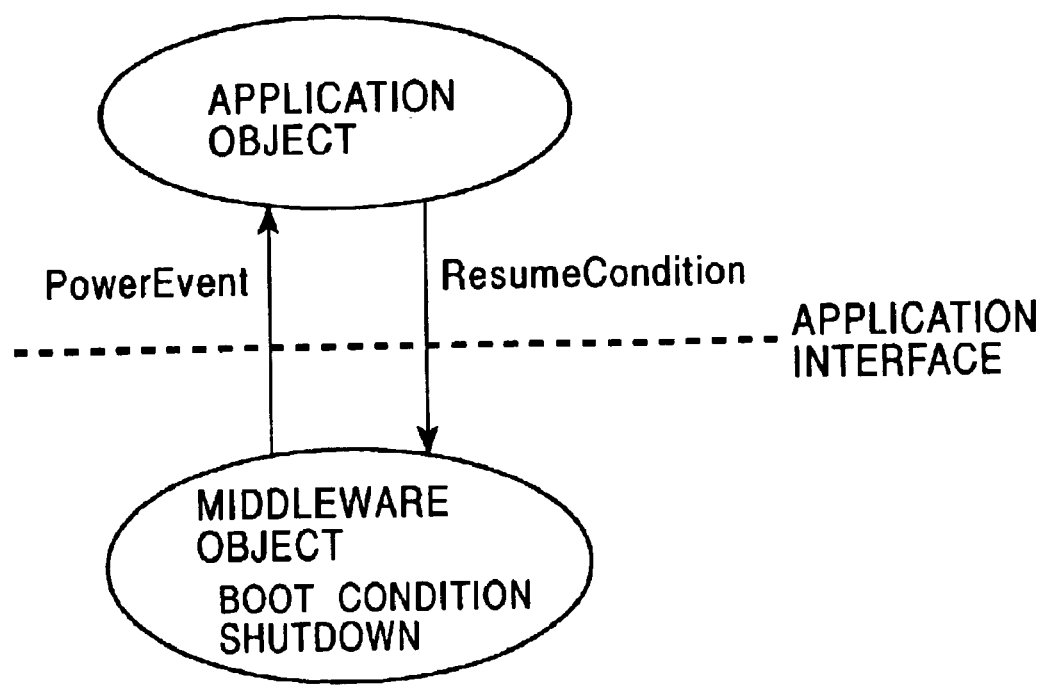
FIG. 24 is a view showing an example usage of aid.
FIG. 25 is a view showing example processes for announcing a shutdown factor via the application interface and for setting a resume condition.

The process corresponding to the system event can be allocated to an array type variable aid[i] constituting the action. An example usage of aid is shown in FIG. 23 and FIG. 24.

The system event does not include the header information (HeaderInfo) or the sensor information (SensorInfo), unlike the sensor value information.

Furthermore, when the application object is not ready, the system event is not discarded but is accumulated.

Shutdown/Resume

The application interface according to the present embodiment comprises a mechanism in which the middleware object notifies the application object of factors of shutdown (Shutdown), and a mechanism in which the application object sets conditions to resume (Resume), that is, to subsequently boot, the middleware object.

The shutdown factors and the resume conditions are closely influenced. For example, if the temperature of a battery during discharging is too high, the time required for the temperature to drop to an appropriate temperature depends upon the characteristics of the machine such as a heat dissipation capability of hardware. As the resume condition at that time, the middleware object notifies the application of the time at which it may occur next as a recommended resume condition. The application object sets the final resume condition from the recommended resume condition and at convenience of the application object itself, and notifies the middleware of it at time of shutdown.

FIG. 25 illustrates an example process to announce the shutdown factor and to set the resume condition via the application interface.

For example, when PowerEvent in which the temperature of a battery during discharging is too high is detected as a shutdown factor, the middleware object notifies the application object of PowerEvent. When the middleware object announces PowerEvent, it also announces the time at which it may occur next, the resume condition, as a recommended resume condition (RecommendCondition).

In response, the application object sets the final resume condition (ResumeCondition) from the recommended resume condition and at convenience of the application object itself, and notifies the middleware object of this at time of shutdown.

FIG. 26 schematically shows the data structure of the shutdown factor PowerEvent which the middleware object notifies the application object of.

As shown in the same figure, PowerEvent is constituted by Time indicating the time at which the shutdown factor occurred, Category indicating a command of the interaction (namely, selectable command), RecommendCondition indicating a condition recommended as a resume condition, Naction indicating the number of actions, and ActionID indicated by a CommandID stream.

FIG. 27 schematically shows the data structure of ResumeCondition which is transferred by the application object to the middleware object in order to set a next boot condition.

As shown in the same figure, ResumeCondition is constituted by Mask indicating a mask at time of notification of the event, Event indicating an event at time of shutdown, and ResumeTime for setting the next resume time.

Command Database (CommandDB)

The application interface according to the present embodiment provides a command interface which aids the application object in controlling the middleware object. The middleware object prepares a command database in order to make it possible to semantically select a command to be executed on the application object among the commands supported by the command interface. The application object can execute a necessary behavior without the consciousness of which motor/effector is actually activated by the middleware object.

FIG. 28 shows an example format of the command database. As shown in the same figure, one record in the command database is constituted by a command identification information (CommandID) field, a classification field, a resource field, a posture information field, a sensor identification information (SensorID) field, an infinite execution flag field, a generation identification information (generation ID) field, and a degree identification information (degree ID) field.

The command identification information (CommandID) is a unique identifier which is uniquely allocated to a record, and can be determined at the discretion of the middleware.

The classification field is further divided into subfields of compatibility, major, intermediate, and minor. The compatibility subfield is a flag indicating that the ID written subsequently thereto is meant by either standard or extended ID. A major classification, an intermediate classification, and a minor classification are described in the major, intermediate, and minor subfields, respectively. With the consciousness of semantic selection of the information, that is, the classification is such that- the semantic aspect of the information is hierarchically described.

The resource field is further divided into bit subfields per management unit of motion (the head, tail, and legs), sound (a single speaker), and specialization (a head LED, and a tail LED). Allocation of the meaning of bit values of the bit subfields can be changed depending upon the capability of the middleware.

The posture information field is further divided into subfields in which a start posture and an end posture during command execution, and posture variations (the posture may change even if the postures at the beginning and at the end are the same) are designated.

The infinite execution flag is a flag indicating that there is no end of execution.

The sensor identification information (SensorID) field includes subfields in which sensor parts to be used when the command is executed and sites on which the sensors are mounted are designated, and flags indicating the compatibility of the parts and the sites.

The generation identification information (generationID) field is a field which expresses using a bit value of the corresponding bit position whether or not it is a command available to generations such as adults, children, and infants. For example, 011 indicates that it can be commonly available to children and infants.

The degree identification information (degree ID) field is a field in which an index value indicating the nominal degree of the command (for example, the amount of movement) is filled.

The maximum generation number, the maximum degree, etc., are individually defined from the shown records.

The command database contains a header (not shown), and, if meeting it, the meaning of extension is known and can be used.

Software such as the application object searches the command database of the middleware object which is combined during execution, and can select the behavior to be executed according to the current instinct or emotion or any other predefined scenario. The command identification information allocated to the selected behavior is passed to the middleware object to execute that behavior, thereby realizing the intended behavior on the robot machine.

The application object can enhance the expression ability on the robot machine by selecting the command so that the resources do not overlap. Furthermore, in the state where the robot is idle, the command whose infinite execution flag has been set is selected to make it possible to continue some action.

FIG. 29 and FIG. 30 show example entries of the records in the command database.

The records of command IDs 100, 101, and 102 indicate commands which all express "pleasant." The application object can select any of the commands according to the statuses of the robot machine (for example, the degree of exhaustion, generation, etc.), and designate which record of "pleasant" is to be used.

The records of command IDs 200 and 201 are commands indicating that an object kicks. They can be used when it is known which motion, sound, or LED that behavior corresponds to, and when the behavior is reliably desired to execute.

Command Status

The application interface according to the present embodiment provides a command interface which aids the application object in controlling the middleware object. In response to a command issued by the application object, the middleware object executes the command on the robot machine via an agent such as a driver object, and returns the status to the application object.

Figure 31:
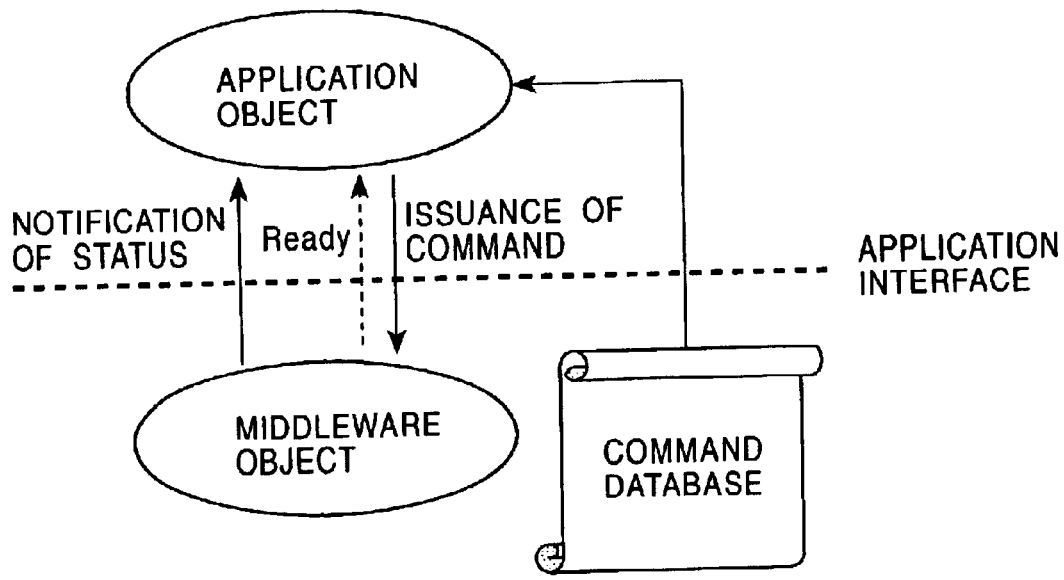
FIG. 31 is a view showing the mechanism in which a command is issued and the status is announced between the application object and the middleware object.

FIG. 31 illustrates the mechanism of an issuance of a command and an announcement of the status between the application object and the middleware object.

The application object can acquire command identification information (CommandID) of a command to realize an action satisfying the current instinct or emotion, or any other predefined scenario based on the command database.

The application object issues a command when the middleware object is ready. In response, the middleware object executes the command on the robot machine via an agent such as a driver object, and returns the status to the application object.

Figure 32:
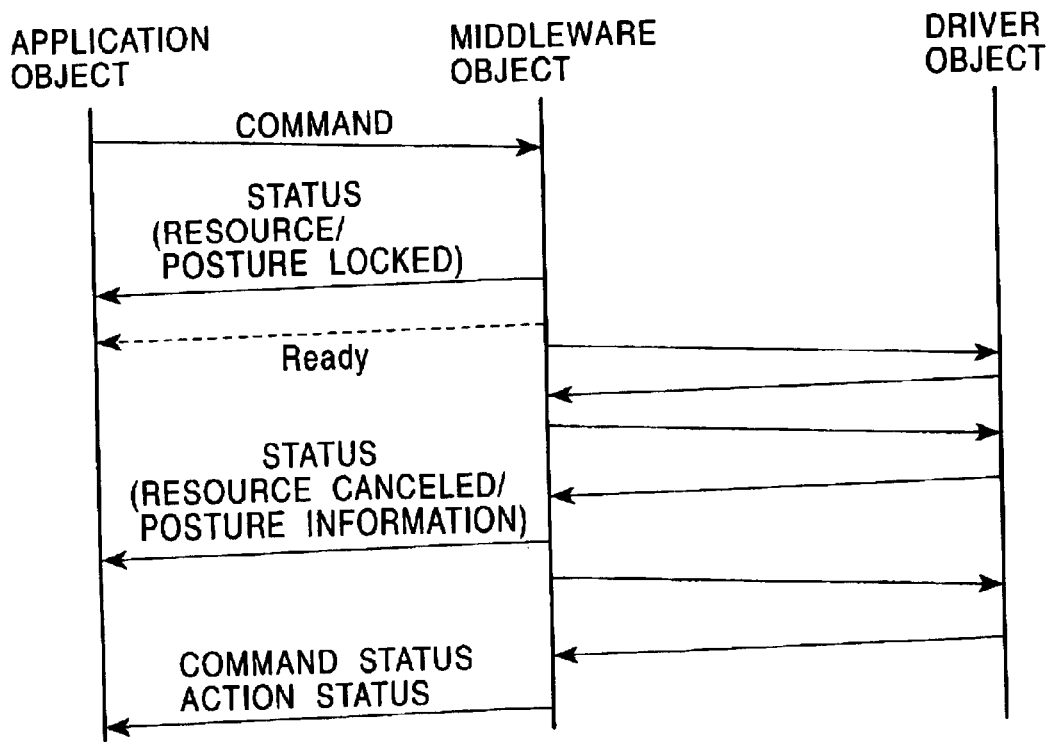
FIG. 32 is a view schematically showing, on a chart, communication between the objects to execute the command issued by the application object.

FIG. 32 schematically shows, on a time chart, communication between the objects to execute the command issued by the application object.

The application object issues a command to the middleware object. In response, the middleware object locks the resource and the posture to make the use by any other command unauthorized, and returns the resource and posture locked information to the application object as the status. Thereafter, the middleware object notifies the application object of the fact that it is ready.

The middleware object requests an agent such as a driver object to execute the command. The input sensor information, etc., are returned from the driver object.

Once the execution of the command has completed, the middleware object cancels the locked state for the next command execution, and releases the resource. It also returns the status including the resource releasing information and the posture information of the machine to the application object.

When the application object successively issues commands at N times or infinite times, basically, the middleware object also returns the status in a similar manner to the procedure in the circumstance where a command is issued once. The resource releasing information and the posture information are supplied to the application object before the final command is executed by the driver object, thus allowing the application object to know the status of the resource and to know a next selectable range of the command.

FIG. 33 schematically illustrates the data structure of the command issued by the application object.

As shown in the same figure, the command is constituted by MW-ID designating a command ID, TargetID designating subject identification information (SubjectID), and TargetPos indicating, in the form of polar coordinate, the position of the target in a sensor coordinate system (however, whereas TargetPos of TargetInfo is a sensor center, in TargetPos as used herein, the applied coordinate is a coordinate at which the sensor site is fixed to the body).

MW-ID is a field for designating command identification information (CommandID) used. The command which can be individually designated includes three kinds, i.e., "normal," "emergency stop," and "stop."

The normal command is overwritten. The commands concerning sound or LEDs are the same as the case of the emergency stop. The motion is the same as the case of the stop. The emergency stop does not guarantee the stable state or the posture. The stop corresponds to a stop at the stable state or posture, and is basically equivalent to the case where it waits for a normal termination.

FIG. 34 schematically illustrates the data structure of TargetID. If 0ID contained in SubjectID is 0×0, TargetPos is enabled.

FIG. 35 schematically illustrates the data structure of the status returned by the middleware object to the application object. As shown in the same figure, the status is constituted by MW-ID designating the command ID, CommandStatus indicating the status of the command, ActionStatus indicating the status of the action, posture identification information PostureID, and resource information ResourceInfo.

The command status CommandStatus is defined for three states, i.e., "Complete," "Not Support," and "Incomplete." If there is no command to be executed or in case of emergency stop, it becomes "Incomplete."

The action status ActionStatus is defined for three states, i.e., "Success" (when success of execution was detected), "Fail" (when failure of execution was detected), and "Unknown" (when there is no function to determine the execution).

The resource information ResourceInfo describes the resource information used by the middleware. FIG. 35 schematically shows the data structure of ResourceInfo. As shown in the same figure, ResourceInfo has resources of motion, sound (speaker), LED, etc., described in the form of bitmap. The correspondence between the bits and the resources can be freely defined. FIG. 36 schematically illustrates a data improvement of the resource information (ResourceInfo)

The posture identification information PostureID describes the current posture.

Appendix

The present invention has been described with reference to the specific embodiment. However, it is apparent that those skilled in the art may make modifications or alternatives of the embodiment without departing from the scope of the present invention.

The gist of the present invention is not necessarily limited to products called "robot." In other words, any mechanical apparatus which uses electric or magnetic actions to move similarly to the motions of human beings could equally be implemented by the present invention even if it is a product which falls within other industrial fields such as toys.

In summary, the present invention has been disclosed in an illustrative form, and is not intended to be construed as restrictive. In order to define the gist of the present invention, the section of CLAIMS noted at the beginning of the Description should be referred to.

Industrial Applicability

According to the present invention, a superior robot control system is provided which controls articulated robots, such as legged walking robots, using a software program.

Furthermore, according to the present invention, a superior robot control system is provided which controls articulated robots, in which the hardware configuration might be significantly modified according to attachment/detachment or replacement of moving units such as legs and a head, using a software program.

Furthermore, according to the present invention, a superior robot control system for controlling articulated robots using a software program which comprises a combination of a software layer having a high dependency upon the hardware configuration and a software layer having no dependency upon the hardware configuration, and a program interface between the software layers are provided.

Furthermore, according to the present invention, a superior robot control system for controlling articulated robots by dynamically modifying a combination of a hardware-dependent software layer, such as middleware, and a hardware-independent software layer, such as applications, and a program interface between the software layers are provided.

According to the present invention, a program interface between a middleware layer which depends upon the hardware configuration of a robot and an application layer which does not depend upon the hardware configuration is established, so that normal operation can always be guaranteed even if a combination of the middleware and the application which is to be introduced onto the robot is modified.

According to the present invention, an interface and a database for semantically performing operation are prepared between application and middleware, so that the application can acquire appropriate input data via the middleware, and can issue an appropriate command for hardware operation to the middleware.

What is claimed is:

1. A robot control system for controlling motions of a robot which comprise a combination of a plurality of hardware components, comprising:
    a first control unit for performing a process which does not depend upon hardware configuration information of the robot;
    a second control unit for performing a process which depends upon the hardware configuration information of the robot; and
    a communication unit for providing communication between said first and second control units.

2. A robot control system according to claim 1, wherein said first control unit is realized by executing application software which determines a behavior sequence of the robot using a model in which a configuration or motion of the robot is abstracted.

3. A robot control system according to claim 1, wherein said first control unit comprises at least one of an emotion model which models an emotion of the robot, an instinct model which models the instinct, a learning model which sequentially stores a causal relationship between an external event and a behavior taken by the robot, and a behavior model which models a behavior pattern.

4. A robot control system according to claim 1, wherein said second control unit is realized by executing middleware software which provides a basic onboard function of the robot.

5. A robot control system according to claim 1, wherein said second control unit includes a recognition processor unit which receives input data detected from hardware of the robot via a system control layer to detect external factors such as distance detection, posture detection, and contact, and an output processor unit for processing an onboard motion control for the robot based on a command from said first control unit.

6. A robot control system according to claim 5, wherein said communication unit notifies said first control unit of the information detected by the recognition processor unit, and transfers the command of said first control unit to the output processor unit.

7. A robot control system according to claim 1, wherein said communication unit comprises an information communication interface which aids in notifying said first control unit of the information from said second control unit.

8. A robot control system according to claim 1, wherein said communication unit comprises a command interface which aids said first control unit in controlling said second control unit.

9. A robot control system according to claim 1, wherein said communication unit comprises an information database in which said first control unit semantically designates information to be retrieved from said second control unit, and a target record in the information database is registered to transfer target information from said second control unit to said first control unit.

10. A robot control system according to claim 1, wherein said communication unit comprises a command database in which said first control unit semantically designates a command to be issued to said second control unit, and
    said first control unit uses the command database to semantically select a command.

11. A robot control system according to claim 1, wherein said communication unit comprises a feedback interface which aids in notifying said second control unit of the recognition result of said first control unit, and which aids in notifying said first control unit of the relationship between the recognition result and the behavior feasible in said second control unit.

12. A robot control system according to claim 1, wherein said first control unit and said second control unit are structured so as to be capable of being independently handled.

13. A robot control system according to claim 1, wherein said communication unit notifies said first control unit of a system event detected by said second control unit.

14. A robot control system according to claim 1, wherein said communication unit comprises:
    means for notifying said first control unit of a shutdown factor which is detected by said second control unit; and
    means for notifying said second control unit of a resume condition with respect to the shutdown which is set by said first control unit.

15. A circuit according to claim 13, wherein said communication unit further includes means for notifying said first control unit of a recommended resume condition which is set by said second control unit.

16. A robot control method for controlling motions of a robot which comprise a combination of a plurality of hardware components using a first control module for performing a process which does not depend upon hardware configuration information of the robot, and a second control module for performing a process which depends upon the hardware configuration information of the robot,
    said robot control method comprising a communication step of providing communication between the first and second control modules.

17. A robot control method according to claim 16, wherein the first control module is implemented by application software which determines a behavior sequence of the robot using a model in which a configuration or motion of the robot is abstracted.

18. A robot control method according to claim 16, wherein the first control module comprises at least one of an emotion model which models an emotions of the robot, an instinct model which models the instinct, a learning model which sequentially stores a causal relationship between an external event and a behavior taken by the robot, and a behavior model which models a behavior pattern.

19. A robot control method according to claim 16, wherein the second control module is implemented by middleware software which provides a basic onboard function of the robot.

20. A robot control method according to claim 16, wherein the second control module includes a recognition processor module which receives input data detected from hardware of the robot via a system control layer to detect external factors such as distance detection, posture detection, and contact, and an output processor module for processing an onboard motion control for the robot based on a command from the first control module.

21. A robot control method according to claim 20, wherein in said communication step, the first control module is notified of the information detected by executing the recognition processor module, and the command by executing the first control module is transferred to the output processor module.

22. A robot control method according to claim 16, wherein in said communication step, an information communication interface which aids in notifying said first control module of the information from the second control module is used.

23. A robot control method according to claim 16, wherein in said communication step, a command interface which aids the first control module in controlling the second control module is used.

24. A robot control method according to claim 16, wherein in said communication step, an information database in which the first control module semantically designates information to be retrieved from the second control module is used to register a target record in the information database, thereby transferring the target information from the second control module to the first control module.

25. A robot control method according to claim 16, wherein in said communication step, using a command database from which the first control module semantically designates a command to be issued to the second control module, the first control module semantically selects the command.

26. A robot control method according to claim 16, wherein in said communication step, a feedback loop is executed to notify the second control module of the recognition result of the first control module, and to notify the first control module of the relationship between the recognition result and the behavior feasible in the second control module.

27. A robot control method according to claim 16, wherein the first control module and the second control module are structured so as to be capable of being independently handled.

28. A robot control method according to claim 16, wherein said communication step includes a substep of notifying the first control module of a system event detected by the second control module.

29. A robot control method according to claim 16, wherein said communication step comprises:

a substep of notifying the first control module of a shutdown factor which is detected by the second control module; and a substep of notifying the second control module of a resume condition with respect to the shutdown which is set by the first control module.

30. A robot control method according to claim 29, wherein said communication step further comprises a substep of notifying the first control module of a recommended resume condition which is set by the second control module.

31. A robot control system which is configured by an object-oriented program, comprising:

an application object for executing a process which does not depend upon a hardware configuration of a robot;

a middleware object for executing a process which depends upon the hardware configuration of the robot;

an information database registered with information which is used for said middleware object and which corresponds to a semantic command from said application object; and object control means for controlling communication between said application object and said middleware object on the basis of said information database.

32. A robot control system according to claim 31, wherein said information database which hierarchically describes a semantic aspect of the registered information.

33. A robot control system according to claim 31, wherein the format of said information database at least includes an information identification information field, a classification field, and a sensor information identification field.

* * * * *